United States Patent [19]

Moran

[11] 4,223,365
[45] Sep. 16, 1980

[54] AUTO RESETTING SWITCHGEAR TRIP INDICATOR CIRCUITS

[75] Inventor: Richard J. Moran, Milwaukee, Wis.

[73] Assignee: McGraw-Edison Company, Rolling Meadows, Ill.

[21] Appl. No.: 25,107

[22] Filed: Mar. 29, 1979

[51] Int. Cl.³ .......................... H02H 3/04; H02H 3/06
[52] U.S. Cl. ........................................ 361/71; 361/96; 361/156; 361/205; 340/644; 340/664
[58] Field of Search ....................... 361/71, 96, 97, 95, 361/75, 156, 155, 206, 208, 205, 191; 340/635, 644, 654, 664

[56] References Cited

U.S. PATENT DOCUMENTS

| | | | |
|---|---|---|---|
| 3,685,035 | 8/1972 | McClain et al. | 361/156 X |
| 3,735,215 | 5/1973 | Conrad. | |
| 3,840,780 | 10/1974 | Sons | 340/654 X |
| 3,846,698 | 11/1974 | Lawton | 340/664 X |
| 4,068,283 | 1/1978 | Russell | 361/96 X |
| 4,128,856 | 12/1978 | MacLeod | 361/156 |

OTHER PUBLICATIONS

Descriptive Bulletin, 38-724 of the Westinghouse Electric Corp. Dated Dec. 1976, entitled –"M.T.R. Static Overcurrent Protection Package".

Primary Examiner—Patrick R. Salce
Attorney, Agent, or Firm—Roy A. Ekstrand; Jon Carl Gealow; Ronald J. LaPorte

[57] ABSTRACT

A trip indicator circuit for a circuit interrupter of an electric power system, which includes an electromagnetic status indicator, having an indicator which is movable between an indicating position and a non-indicating position, a pulse-actuated set coil for moving the indicator to the indicating position, and a pulse-actuated reset coil for moving the indicator to the non-indicating position. An indicator set circuit for energizing the set coil is connected across the trip coil by an electronic switching device which is rendered conductive by an overcurrent sensing circuit whenever a particular abnormal condition occurs in the electric power system, so that the set coil will be energized only when the circuit interrupter is tripped during the occurrence of the particular abnormal condition. A reset circuit is connected across the closing coil to energize the reset coil each time the circuit interrupter is closed. The reset circuit includes a capacitor which is connected across the closing coil in series with the reset coil and a first diode which is orientated so that, when the closing coil is energized, a current pulse flows through the first diode, the capacitor, and the reset coil until the capacitor is fully charged. The reset circuit further includes a resistor connected across the first diode, and a second diode connected across the reset coil and orientated to allow the capacitor to discharge through the resistor, the closing coil, and the second diode when the closing coil is deenergized. The resistor prevents two closely-spaced resetting operations of the indicator, which otherwise may occur when the interrupter is tripped immediately after being closed.

9 Claims, 3 Drawing Figures

AUTO RESETTING SWITCHGEAR TRIP INDICATOR CIRCUITS

BACKGROUND OF THE INVENTION

1. Field of the Invention

The present invention relates generally to electro magnetic status indicators, and, more particularly, to overcurrent trip indicators for a circuit interrupter of a high voltage alternating electric power system for providing indication of various overcurrent conditions occurring in the electric power system at the time the tripping operation of the circuit interrupter is initiated.

2. Prior Art

U.S. Pat. No. 4,068,283, issued Jan. 10, 1978 to Ronald R. Russell, disclosures an automatic circuit interrupter for an electric power circuit having an instantaneous trip circuit for tripping the circuit interrupter when a high fault or overcurrent flows in one or more of the phase lines, a delay trip circuit for tripping the circuit interrupter when a low or moderate fault or overcurrent flows in one or more of the phase lines, and a ground fault trip circuit for tripping the circuit interrupter upon the occurrence of a ground fault in the electric power system. Three electromagnetic overcurrent trip indicators, are actuated by the instantaneous trip circuit, the delay trip circuit, and the ground fault trip circuit, respectively. When the circuit interrupter is tripped by one of the three trip circuits, the overcurrent trip indicators associated with that one trip circuit is moved to its indicating position. Thus, after the circuit interrupter has been tripped by one of the three trip circuits, examination of the three trip indicators will disclose whether the abnormal condition of the electric power system causing the second interrupter to trip is a phase fault condition, a phase overload condition, or a ground fault condition.

However, it would be very beneficial to know, from a troubleshooting standpoint, which phase or phases of the electric power system were overloaded or faulted to initiate tripping of the circuit interrupter. Further, it would be advantageous to have trip indicators which would indicate various abnormal conditions of the electric power system at the time tripping of the circuit interrupter was initiated, even though tripping of the circuit interrupter was not a result of one of these abnormal conditions. For example, when an overload condition occurs in the electric power system, but the circuit interrupter is manually tripped before the tripping operation is initiated by an overcurrent tripping circuit, it would be desirable for the trip indicators to indicate the overload condition. Also, when the circuit interrupter automatically recloses one or more times before finally remaining open, it would be desirable to have trip indicators which were automatically reset each time the circuit interrupter was closed, so that, after a tripping operation of the circuit interrupter, the trip indicators will indicate only abnormal conditions existing in the electric power system at the time the circuit interrupter was last tripped.

SUMMARY OF THE INVENTION

A quick make, quick break, trip free, circuit interrupter for an alternating electric power system includes a trip coil which is energized to initiate a tripping operation of the circuit interrupter, and a closing coil which is energized to initiate a closing operation of the circuit interrupter. The trip coil is connected in series with a normally closed auxiliary contact of the circuit interrupter and a trip switching element across the output terminals of a DC power supply. The closing coil is connected in series with a normally closed auxiliary contact of the circuit interrupter and a close switching element across the output terminals of the DC power supply. A trip indicator assembly includes a pickup circuit coupled to the alternating electric power system for producing an output signal upon the occurrence of a particular abnormal condition of the electric power system, such as an overcurrent flowing in one particular phase of the power system. The trip indicator assembly also includes an electromagnetic status indicator, having an indicator which is movable between an indicating position and a non-indicating position, a set coil for moving the indicator to its indicating position when a pulse of DC current flows through the set coil in a first direction, and a reset coil for moving the indicator to its non-indicating position when a pulse of DC current flows through the reset coil in the first direction.

The reset coil is connected across the closing coil of the circuit interrupter through a first capacitor and a first diode which is disposed in series with the first capacitor and the reset coil to allow current to flow in a first direction through the reset coil when the closing coil of the circuit interrupter is energized until the first capacitor is fully charged. A second diode is connected across the reset coil to prevent current from flowing through the reset coil in a second direction opposite the first direction, and a first resistor is connected across the first diode.

The set coil is connected across the trip coil of the circuit interrupter through a second capacitor and an electronic switching device which is actuated by the pickup circuit and which is rendered conductive upon receiving the output signal of the pickup circuit. A second resistor is connected across the series combination of the set coil and the second capacitor, and a third diode is connected across the set coil to prevent current from flowing through the set coil in an opposite direction from the first direction by bypassing current flowing in the opposite direction around the set coil.

When the particular abnormal condition of the electric power system sensed by the pickup circuit occurs, the pickup circuit will produce an output signal to turn on the electronic switching device connected in series with the capacitor and the set coil across the trip coil of the circuit interrupter. Then, when the trip switching element is closed, or rendered conductive, to energize the trip coil and initiate a tripping operation of the circuit interrupter, a pulse of current will flow through the set coil in the first direction until the second capacitor is fully charged. When the circuit interrupter opens, the normally open auxiliary contacts will open to deenergize the trip coil and the set coil circuit of the indicator assembly. When the set coil circuit is deenergized, the second capacitor will discharge through the third diode and the second resistor.

When the circuit interrupter is open and the close switching element is closed or rendered conductive, the closing coil is energized to initiate a closing operation of the circuit interrupter, and a pulse of current will flow through the first diode, the first capacitor, and the reset coil in the first direction to return the indicator to its non-indicating position. Then, when the normally closed auxiliary contacts open the first capacitor will discharge through the first resistor, the closing coil, and the second diode.

Four of the above-described trip indicator assemblies can be coupled to the electric power system to sense overcurrents occurring in the three phases and ground, respectively. Whenever the circuit interrupter is tripped, the four trip indicators will indicate whether a ground fault, or an overcurrent condition existed in any of the three phases of the electric power system at the time tripping of the circuit interrupter was initiated. Another resistive circuit element may be used in the reset coil circuit in place of the closing coil. However, the use of the closing coil is preferred, since this provides better assurance that the overcurrent trip indicators will only be reset when the circuit interrupter is actually closed.

BRIEF DESCRIPTION OF THE DRAWING

It is believed that the invention will be better understood by the following detailed description and drawings in which.

DESCRIPTION OF PREFERRED EMBODIMENTS

Figure 1:
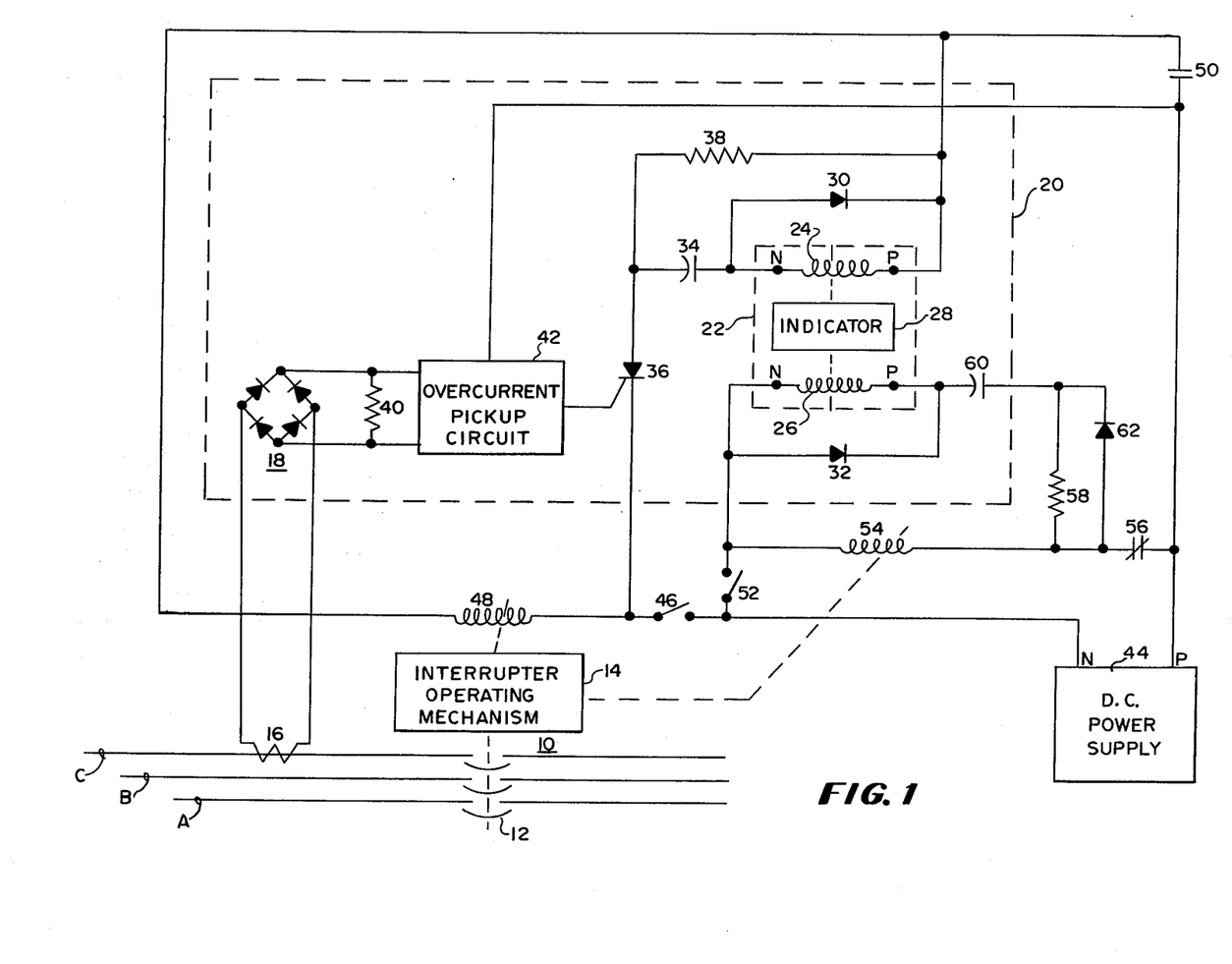
FIG. 1 is an electrical schematic diagram, partially in block form, of an overcurrent trip indicator assembly, according to the invention.

Referring now to FIG. 1, a circuit interrupter 10 has ganged sets of interrupting contacts 12 disposed in three phases A, B and C of an alternating electrical power system, which are movable between a closed position and an open, or tripped, position by an interrupter operating mechanism 14. The secondary winding of a current transformer 16, which is magnetically coupled to the phase line C of the alternating electric power system, is connected to the A.C. inputs of a single phase, full wave, rectifier bridge 18 of an indicator assembly 20.

The indicator assembly 20 indludes an electromagnetic status indicator 22 which, in a preferred embodiment of the invention, is the type 30 SC-02-00 indicator made by Ferranti-Packer Electric Limited, of Toronto, Canada. The status indicator 22 includes a set coil 24 having a positive terminal P and a negative terminal N, a reset coil having a positive terminal P and a negative terminal N, and an indicator 28 which is movable between an indicating position and an non-indicating position. The indicator is moved from its non-indicating position to its indicating position when a pulse of direct current flows through the set coil in one direction, and the indicator is moved from its indication position to its non-indicating position when a similar pulse of direct current flows through the reset coil in one direction. The minimum pulse required to operate either the set coil 24 or the reset coil 26 is a 250 milliampere, 1.5 millisecond pulse. When a maximum pulse current of 1 ampere is used, the pulse time can be decreased to approximately 180 microseconds.

A diode 30 has a cathode which is connected to the positive terminal P of the set coil 24, and an anode which is connected to the negative terminal N of the set coil 24. Another diode 32 has a cathode which is connected to the positive terminal P of the reset coil 26, and an anode which is connected to the negative terminal N of the reset coil 26. The negative terminal N of the set coil 24 is connected through a capacitor 34 to the anode of a silicon controlled rectifier 36. The positive terminal P of the set coil 24 is also connected to the anode of the silicon controlled rectifier 36 through a resistor 38.

A current sensing resistor 40 is connected across the D.C. outputs of the rectifier bridge 18. The direct voltage signal produced across the resistor 40, which is proportional to the alternating current flowing in the phase line C of the electric power system, is supplied to the inputs of an overcurrent pickup circuit 42, which is similar to the phase or ground pickup circuits described in my U.S. Pat. No. 4,131,929 issued Dec. 26, 1978. When the voltage received at the inputs of the overcurrent pickup circuit 42 exceeds a predetermined amplitude, a positive potential output signal is produced at the output of the overcurrent pickup circuit 42, in a manner more fully described in the above-referenced U.S. Pat. No. 4,131,929. Operating power for the overcurrent pickup circuit 42 is supplied from a D.C. power supply 44.

The gate of the silicon controlled rectifier 36 is connected to the output of the overcurrent pickup circuit 42. The cathode of the silicon controlled rectifier 36 is connected to a negative terminal N of the DC power supply 44 through a trip switching element 46.

A trip coil 48, which is operatively connected to the interrupter operating mechanism 14 to trip the circuit interrupter 10 when the trip coil 48 is energized, has one end connected to the negative terminal N of the DC power supply 44 through the trip switching element 46. An opposite end of the trip coil 48 is connected to a positive terminal P of the DC power supply 44 through a normally open pair of auxiliary contacts 50 of the circuit interrupter, which close when the interrupting contacts 12 close, and open when the interrupting contacts 12 open.

The negative terminal N of the reset coil 26 is connected through a close switching element 52 to the negative terminal N of the DC power supply 44. A closing coil 54, which is operatively connected to the interrupter operating mechanism 14 to close the circuit interrupter 10 when the closing coil 54 is energized, has a first end connected to the negative terminal N of the DC power supply 44 through the close switching element 52. An opposite second end of the closing coil 54 is connected to the positive terminal P of the DC power supply 44 through a normally closed pair of auxiliary contacts 56, which open when the interrupting contacts 12 close, and close when the interrupting contacts 12 open. The second end of the closing coil 54 is also connected to a first end of a resistor 58, which has an opposite second end connected through a capacitor 60 of the indicator assembly 22 to the positive terminal P of the reset coil 26. A diode 62 has an anode which is connected to the first end of the resistor 58, and a cathode which is connected to the second end of the resistor 58.

When the circuit interrupter 10 is open, as shown in FIG. 1, the auxiliary contacts 50 are open and the auxiliary contacts 56 are closed. If then, the close switching element 52 is closed, or rendered conductive, the closing coil 54 will be energized from the DC power supply 44 through the auxiliary contacts 56 and the close switching element 52 to initiate a closing operation of the circuit interrupter 10. Also, when the close switching element 52 closes, the positive terminal P of the reset coil 26 will be connected to the positive terminal P of the DC power supply 44 through the auxiliary contacts 56, the diode 62, and the capacitor 60, and the negative terminal N of the reset coil 26 will be connected to the negative terminal N of the DC power supply 44 through the switching element 52. A pulse of direct current will flow through the reset coil 26 in a direction from the positive terminal P to the negative terminal N of the reset coil 26 until the capacitor 60 is fully charged. The capacitor 60 is selected so that the amplitude and duration of the direct current pulse flowing through the reset coil 26 is sufficient to move the indicator 28 to its non-indicating position before the auxiliary contacts 56 open. When the interrupting contacts 12 close and the auxiliary contacts 56 open, the indicator reset circuit is deenergized and the capacitor 60 discharges through the resistor 58, the closing coil 54, and the diode 32.

When the circuit interrupter 10 is closed and the current flowing in the phase C line of the alternating electric system exceeds the predetermined value, the overcurrent pickup circuit 42 will supply a positive overcurrent signal to the gate of the silicon controlled rectifier 36 to render the silicon controlled rectifier 36 conductive between its anode and cathode. However, the silicon controlled rectifier 36 will not conduct unless or until the trip switching element 46 is closed, or rendered conductive, to connect to silicon controlled rectifier 36 in series with the capacitor 34, the set coil 24, and the auxiliary contacts 50 across the positive and negative terminals of the DC power supply 44. If the trip switching element 46 remains open or in its nonconducting state, and the current flowing in the phase C line of the alternating electric power supply system falls below the predetermined level, the silicon control rectifier 36 will revert to its nonconducting state so that a subsequent closing of the trip switching element 46 will not cause the silicon controlled rectifier 36 to conduct.

The trip switching element 46 may be a manual switch, a relay, or an electronic switching device such as a silicon control rectifier which is actuated by an overcurrent or under-voltage sensing circuit coupled to the alternating electric power system. When the trip switching element 46 is closed or rendered conductive, the trip coil 48 is energized from the DC power supply 44 through the auxiliary contacts 50 to initiate a tripping operation of the circuit interrupter 10, and is thereafter deenergized when the auxiliary contacts 50 open. If the current flowing in the phase C line of the alternating electric power system is greater than the predetermined value of the overcurrent pickup circuit 42, when the trip switching element 46 is closed or rendered conductive, the set coil 24 and the capacitor 34 connected in series with the set coil 24 will be connected across the positive and negative terminals of the DC power supply through the auxiliary contacts 50, the silicon rectifier 36, and the trip switching element 46. A positive current will flow through the set coil 24 in a direction from the positive terminal P to the negative terminal N of the set coil 24 until the capacitor 34 is fully charged. The capacitor 34 is selected so that the amplitude and duration of the direct current pulse through the set coil 24 is sufficient to move the indicator 28 to its indicating position before the auxiliary contacts 50 open. When, thereafter, the auxiliary contacts 50 open, the indicator set circuit is deenergized, and the capacitor 34 discharges through the diode 30, and the resistive element 38.

The capacitors 34 and 60 are selected to be quickly charged when a tripping or closing operation of the circuit interrupter 10 is initiated, to assure that the indicator 28 is moved to its indicating or non-indicating position before the auxiliary contacts 50 or 56 open. Typically, the capacitors 34 and 60 are fully charged in approximately 700 microseconds.

Similarly, the resistive element 38 is selected to assure that the capacitor 34 is completely discharged before the circuit interrupter 10 can reclose and another tripping operation can be initiated, and the resistive element 58 is selected to assure that the capacitor 60 is completely discharged before another closing operation can be initiated after the circuit interrupter has been closed and tripped.

When the circuit interrupter 10 is closed by the quick make, quick break, trip-free, interrupter operating mechanism 14, the auxiliary contacts 56 may bounce, or "chatter", that is, the contacts 56 may reclose momentarily after initially opening during a closing operation of the circuit interrupter 10 after the auxiliary contacts 50 have closed.

If the resistor 58 is not disposed in the discharge path of the capacitor 60, and the closing coil 54 is connected in series with the diode 32 across the capacitor 60, the capacitor 60 will be completely discharged almost immediately after the auxiliary contacts 56 initially open during a closing operation, since the magnetic energy stored in the closing coil 54 will quickly nullify at least a portion of the charge on the capacitor 60. Then, when the auxiliary contacts 56 reclose momentarily, due to the very fast charging time of the capacitor 60, another pulse current will flow through the reset coil 26 sufficient to reset the indicator 28 before the auxiliary contacts 56 finally open. When no overcurrent or fault condition exist in phase C of the alternating electric power system and when the trip switching element 46 is not immediately closed or rendered conductive when the interrupting contacts 12 are closed, the second pulse of current which will flow through the reset coil 26 when the auxiliary contacts 56 are momentarily reclosed will not adversely effect the operation of the phase C overcurrent trip indicator. However, if the trip switching element 46 is immediately closed when the interrupting contacts 12 are closed and a fault condition which exists in the phase C line causes the overcurrent pickup circuit 42 to render the silicon controlled rectifier 36 conductive immediately after the interrupting contacts 12 close, the indicator 28 will be moved to its indicating position before the auxiliary contacts 56 have momentarily reclosed. Then, when the auxiliary contacts 56 momentarily close, the indicator 28 will be reset to its non-indicating position, so that no indication is given after the circuit interrupter 10 has been tripped that an overcurrent or fault condition existed in the phase C line of the alternating electric power system at the time the tripping operation was initiated.

Such misoperation of the phase C overcurrent trip indicator is prevented by the resistor 58, which is disposed in the discharge circuit of the capacitor 60, and the diode 62 which is disposed across the resistor 58 to provide a low impedance path for the charging current of the capacitor 60 around the resistor 58, so that the capacitor 60 will still be quickly charged. The resistor 58 is selected so that the capacitor 60 is only partially discharged when the auxiliary contacts 56 are initially opened. Consequently, when the auxiliary contacts 56 are momentarily closed thereafter before finally opening, the pulse of current which will flow through the reset coil 26 until the capacitor 60 is completely recharged will be insufficient to reset the indicator 28 to its non-indicating position.

Figure 2:
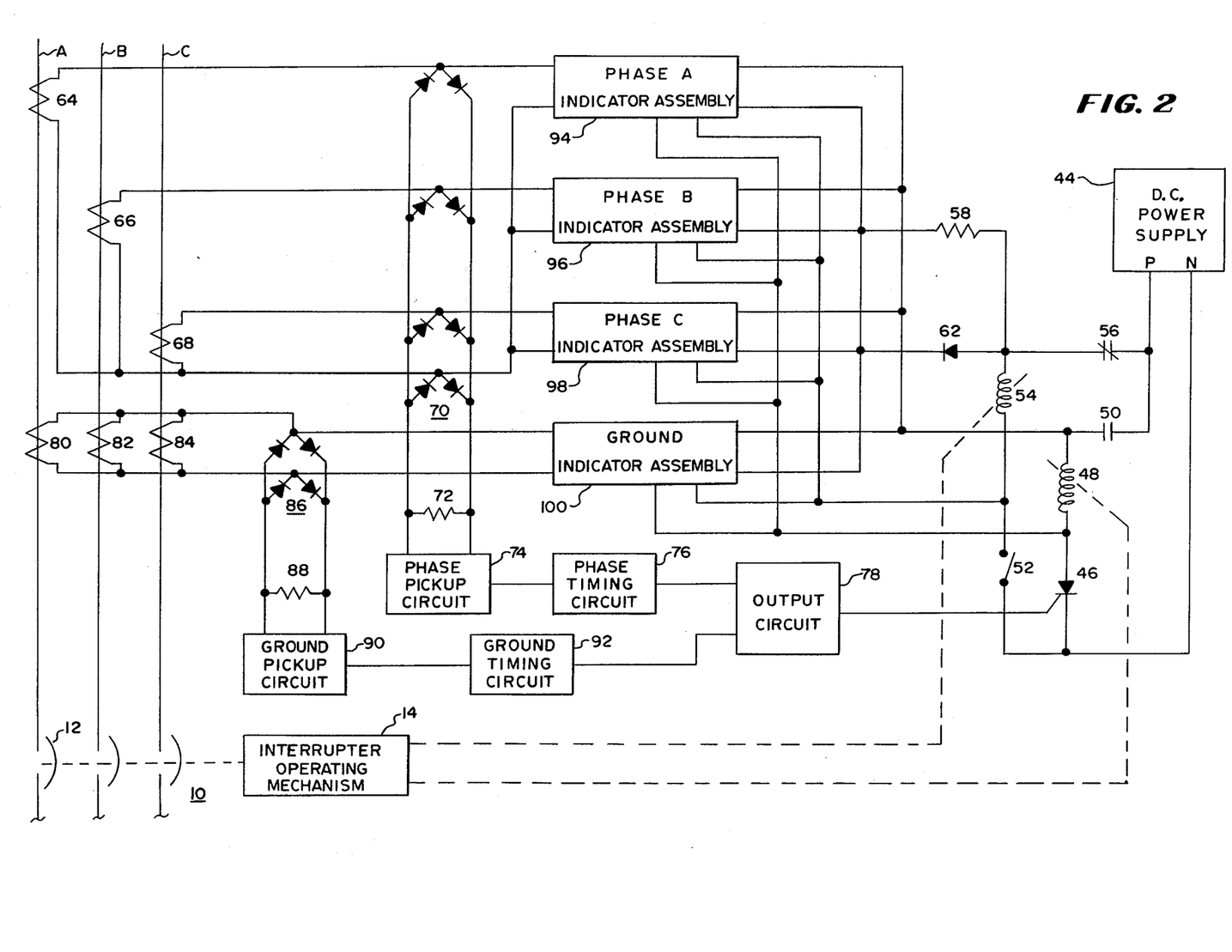
FIG. 2 is an electrical schematic diagram, partially in block form, showing four of the overcurrent trip indicting assemblies of FIG. 1, coupled to the electric power system and to the circuit interrupter, to indicate phase or ground overcurrents occurring at the time tripping of the circuit interrupter is initiated.

The block diagram of FIG. 2 illustrates a control circuit for the 3 phase circuit interrupter 10, similar to that disclosed in my U.S. Pat. No. 4,131,929, issued Dec. 26, 1978. Three current transformers 64, 66, and 68 are magnetically coupled to the phase lines A, B, and C respectively of the alternating electric power system. The secondary winding of the current transformers 64, 66, and 68 are wye-connected, with their neutral and phase terminals being connected to supply current to an eight diode rectifier bridge 70, also described in the above referenced U.S. Pat. No. 4,131,929. A phase current sensing resistor 72 is connected across the DC output terminals of the rectifier bridge 70. The inputs of a phase pickup circuit 74 and a phase timing circuit 76, similar to the phase pickup circuit and phase timing circuit described in the above-referenced U.S. Pat. No. 4,131,929, are connected across the phase current sensing resistor 72. The output of the phase pickup circuit 74 is connected to the phase timing circuit 76 to actuate the phase timing circuit 76 upon receipt of a phase pickup signal from the phase pickup circuit 74. The output of the phase timing circuit 76 is connected to the input of an output circuit 78, also described in U.S. Pat. No. 4,131,929, which is actuated upon receipt of an output signal from the phase timing circuit 76.

Three additional current transformers 80, 82, and 84 are also magnetically coupled to the phases A, B, and C, respectively, of the alternating electric power system. The secondary windings of the current transformers 80, 82, and 84 are connected in parallel across the AC inputs of a single phase, full wave, rectifier bridge 86. A ground current sensing resistor 88 is connected across the DC outputs of the rectifier bridge 86. The input of a ground pickup circuit 90 and a ground timing circuit 92, similar to the ground pickup circuit and ground timing circuit described in U.S. Pat. No. 4,131,929, are connected to receive the voltage produced across the ground current sensing resistor 88. The output of the ground pickup circuit 90 is connected to the ground timing circuit 92, which is actuated upon receipt of an output signal from the ground pickup circuit 90. The output of the ground timing circuit 92 is connected to the output circuit 78, which is actuated upon receipt of an output signal of the ground timing circuit 92.

As explained in the above-mentioned U.S. Pat. No. 4,131,929, the phase current sensing resistor 72 will produce a peak voltage proportional to a peak phase current of the alternating electric power system at least once every half cycle. Upon the occurrence of a predetermined minimum voltage across the resistor 72 indicating a phase overcurrent condition, the phase pickup circuit 74 activates the phase timing circuit 76, which, after a time delay proportional to the peak voltage output of the resistor 72, actuates the output circuit 78. Similarly, the ground current sensing resistor 88 produces a peak voltage every half cycle proportional to the peak value of ground current in the alternating electric power system. Upon the occurrence of a predetermined minimum voltage across the resistor 88 indicating a ground over current condition, the ground pickup circuit 90 actuates the ground timing circuit 92, which, in turn, actuates the output circuit 78 after a time delay proportional to the peak voltage output of the resistor 88.

The operation of the output circuit 78, the phase pickup and timing circuits 74 and 76, and the ground pickup and timing circuits 90 and 92 are fully described in the above-referenced U.S. Pat. No. 4,131,929, and hence will not be discussed in detail herein. Also, although not shown in the drawing, it will be understood that the DC power supply 44 is connected to power the various circuits 74, 76, 78, 90, and 92.

In FIG. 2, the trip switching element 46 is depicted as a silicon controlled rectifier 46, having an anode connected to the trip coil 48, a cathode connected to the negative terminal N of the DC power supply 44, and a gate connected to the output of the output circuit 78. When the circuit interrupter 10 is closed, and the output circuits 78 is actuated by either the phase timing circuit 76 or the ground timing circuit 92, the output circuit 78 supplies a positive direct voltage signal to the gate of the silicon controlled rectifier 46, which is switched to its conducting state to connect the trip coil 48 across the positive and negative terminals of the DC power supply 44 through the auxiliary contacts 50. When the trip coil 48 is energized, it actuates the interrupter output mechanism 14 to quickly open the interrupting contacts 12 of the circuit interrupter 10. When the interrupting contacts 12 opens, the auxiliary contacts 50 also open to deenergize the trip coil 48.

Four indicator assemblies 94, 96, 98, and 100 which are identical to the indicator assembly 20 of FIG. 1, are depicted in block form in FIG. 2. The indicator assemblies 94, 96, and 98 have input terminals connected across the current transformer 64, 66, and 68 respectively, to monitor the currents flowing in the phases A, B, and C, of the alternating electric power system. The indicator assembly 100 has input terminals connected across the secondary windings of the three current transformers 80, 82, and 84, to monitor the ground current of the alternating electric power system. All of the other terminals of each indicator assembly 94, 96, 98, and 100 are electrically connected to the corresponding terminals of the other indicator assemblies 94, 96, 98, and 100.

When the circuit interrupter 10 is open as depicted in FIG. 2, and the close switching element 52 is closed or rendered conductive, the closing coil 54 is energized through the auxiliary contacts 56 from the DC power supply 44 to initiate a closing operation of the interrupter operating mechanism 14. Also, when the close switching element 52 is closed, the reset circuit of each indicator assembly 94, 96, 98 and 100, which includes the reset coil 26 connected in series with the capacitor 60, is connected across the positive and negative terminals of the DC power supply 44 through the diode 62, the auxiliary contacts 56, and the close switching element 52. Consequently, a pulse of current flow through each reset coil 26 of the four indicator assemblies 94, 96, 98, and 100 of sufficient magnitude to reset the four indicators 26 of the indicator assemblies 94, 96, 98, and 100. When the interrupting contacts 12 close, the auxiliary contacts 56 open to deenergize the closing coil 54.

When the circuit interrupter 10 is closed, and an overcurrent or fault condition occurs in one of the three phases A, B, or C sufficient to cause the interrupter control circuit to trip the circuit interrupter 10, the indicator 28 of the particular indicator assembly 94, 96 or 98 associated with the phase A, B, or C in which the overcurrent or fault condition occured will be moved to its indicating position. For example, when the current flowing in the phase A of the alternating electric power system exceeds the predetermined pickup level of the indicator assembly 94 and the phase circuit 74, the silicon controlled rectifier 36 of the indicator assembly 94 will be rendered conductive, and the phase pickup circuit 74 will actuate the phase timing circuit 76. After a time delay proportional to the current flowing in phase A, the phase timing circuit 76 will actuate the output circuit 78, which, in turn, renders the silicon controlled rectifier 46 conductive. When the silicon controlled rectifier 46 is turned on, the trip coil 48 is energized to initiate a tripping operation of the circuit interrupter 10, and a pulse of current is supplied to the set coil 24 of the indicator assembly 94 to move the indicator 28 of the indicator assembly 94 to its indicating position. Similarly, if the currents flowing in two or all three of the phases A, B, and C exceed the minimum pickup level of the phase pickup circuit 74 and the indicator assemblies 94, 96, and 98, the indicators associated with the two or three overloaded phase lines will be moved to their indicating positions, when the circuit interrupter 10 is tripped. Also, when the ground current of the alternating electric power system exceeds the minimum pickup level of the ground indicator assembly 100 and the ground pickup circuit 90, the indicator 28 of the ground indicator assembly 100 will be moved to its indicating position when the circuit interrupter 10 is tripped.

Figure 3:
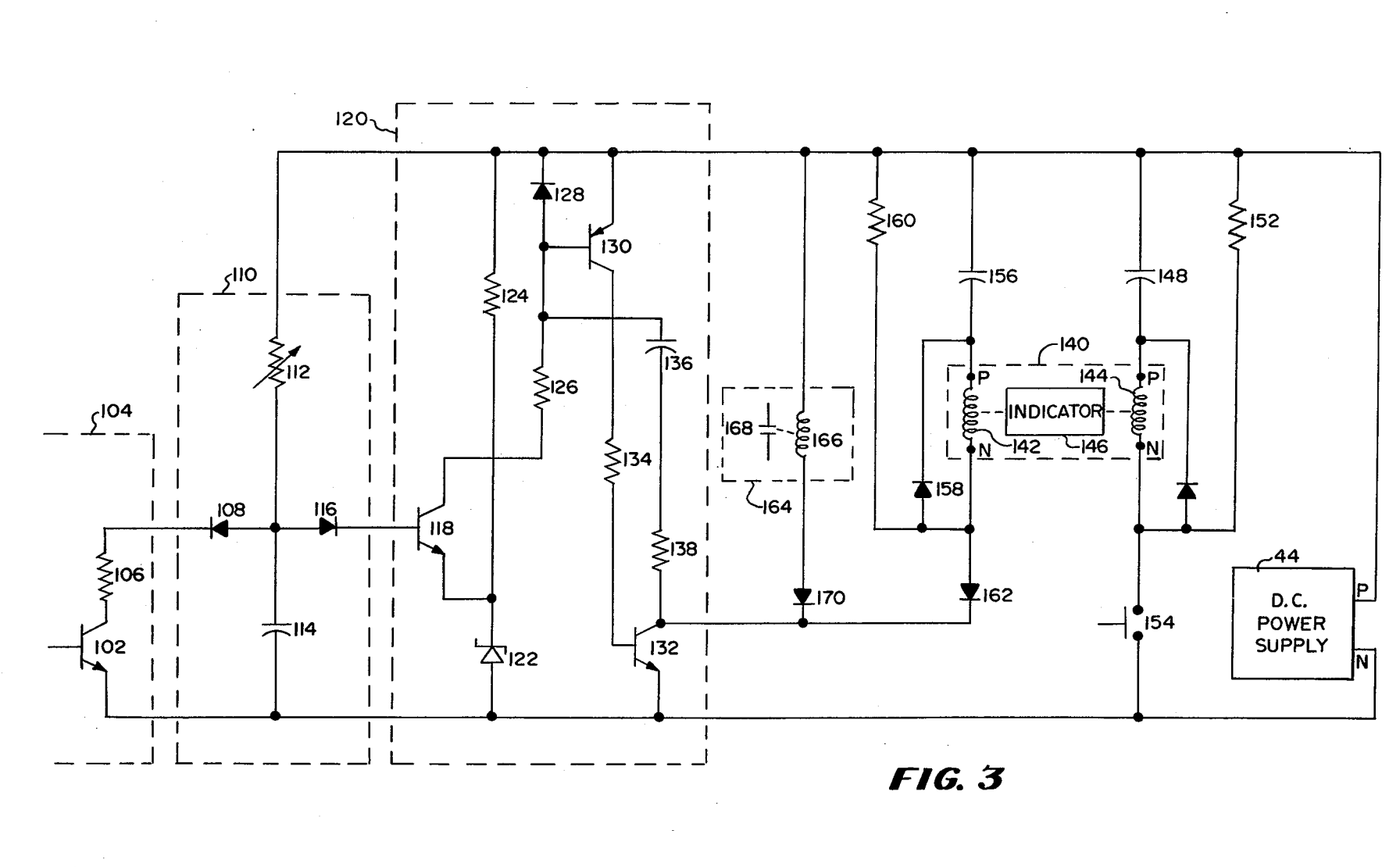
FIG. 3 is a schematic diagram of an other embodiment of an invention, showing a circuit for sensing an abnormal condition of the electric power system and moving the indicator of a electro magnetic status indicator to the indicating position, which is independent of the tripping operation of the circuit interrupter.

The electromagnetic status indicator 22 may also be used to indicate the occurrence of an abnormal condition in the alternating electric power system when the circuit interrupter 10 is not tripped. For example, the electromagnetic status indicator 22 can be used with a proportional ground current relay for activating an alarm circuit, which is similar to the proportional ground current relay disclosed in my U.S. patent application Ser. No. 830,653, filed Sept. 6, 1977. In FIG. 3., the output transistor 102 of a ground pickup circuit 104 is similar to the ground pickup circuit disclosed in the above-referenced U.S. patent application Ser. No. 830,653, is a NPN transistor having a base connected to stop receiving a positive turn on signal whenever the peak ground current of the alternating electric power system exceeds a preselected percentage of the center magnitude phase current of the power system, an emitter which is connected to the negative terminal N of the DC power supply 44, and a collector which is connected through a resistor 106 to the cathode of a diode 108 of a ground timing circuit 110. The anode of the diode 108 is connected to the positive terminal P of the DC power supply 44 through an adjustable resistor 112, to the negative terminal N of the DC power supply 44 through a timing capacitor 114, and to the anode of a blocking diode 116. The cathode of the diode 116 is connected to the base of a transistor 118 of an output circuit 120. The emitter of the transistor 118 is connected to the negative terminal N of the DC power supply 44 through a Zener diode 122, and to the positive terminal P of the DC power supply 44 through a resistor 124. The collector of the transistor 118 is connected through a resistor 126 to the anode of a diode 128, and to the base of a PNP transistor 130. The cathode of the diode 128 and the emitter of the transistor 130 are connected to the positive terminal P of the DC power supply 44. The collector of the transistor 130 is connected to the base of an output transistor 132 through a resistor 134. The emitter of the transistor 132 is connected to the negative terminal N of the DC power supply 44. One side of a capacitor 136 is connected to the base of the transistor 130, and an opposite side of the capacitor 136 is connected to the collector of the transistor 132 through a resistor 138.

An electromagnetic status indicator 140, similar to the status indicator 22 of FIG. 1, includes a set coil 142 having a positive terminal P and a negative terminal N, a reset coil 144 having a positive terminal P and a negative terminal N, and an indicator 146 which is movable between an indicating position and a non-indicating position. The indicator 146 is moved from its non-indicating position to its indicating position when a pulse of direct current flows through the set coil 142 in a direction from the positive terminal P to the negative terminal N of the set coil 142. The indicator 146 is moved from its indicating position to its non-indicating position when a similar pulse of direct current flows through the reset coil 144 in a direction from the positive terminal P to the negative terminal N of the reset coil 144. The positive terminal P of the reset coil 144 is connected to the positive terminal P of the DC power supply 44 through a capacitor 148, and is also connected to the cathode of a diode 150. The anode of the diode 150 is connected to the negative terminal N of the reset coil 144. The negative terminal N of the reset coil 144 is connected to the positive terminal P of the DC power supply 44 through a resistor 152, and is connected to the negative terminal N of the DC power supply 44 through a normally open pair of pushbutton contacts 154. The positive terminal P of the set coil 142 is connected to the positive terminal P of the DC power supply 144 through a capacitor 156, and is also connected to the cathode of a diode 158. The anode of the diode 158 is connected to the negative terminal N of the set coil 142. The negative terminal N of the set coil 142 is connected to the positive terminal P of the DC power supply 44 through a resistor 160, and is connected to the anode of a blocking diode 162. The cathode of the blocking diode 162 is connected to the collector of the output transistor 132 of the output circuit 120.

A relay 164 includes an operating coil 166 and a pair of normally open contacts 168 which are closed when the operating coil 166 is energized, and which may be connected to energize either an alarm circuit or the trip coil 58 of the circuit interrupter 10. One end of the operating coil 166 is connected to the positive terminal P of the DC power supply 44, and an opposite end of the operating coil 166 is connected to the anode of a blocking diode 170. The cathode of the diode 170 is connected to the collector of the output transistor 132.

When the circuit interrupter 10 is closed, and ratio of the ground current to the phase current of the alternating electric power system is normal, the transistor 102 is turned on to bypass the timing current flowing through the adjustable resistor 112, and maintain the voltage across the capacitor 114 at a low level. The voltage at the emitter of the transistor 118, determined by the Zener diode 122, will be higher than the voltage across the capacitor 114, and the transistors 118, 130, and 132, will be turned off. When the ground current of the alternating electric power system exceeds a preselected percentage of the center magnitude phase current, the transistor 102 will turn off, as explained in detail in the above-referenced U.S. patent application Ser. No. 830,653. When the transistor 102 is turned off, the timing current determined by the adjustable resistor 112 will start to charge the timing capacitor 114. When the voltage across the timing capacitor 114 exceeds the sum of the forward voltage drop through the diode 116, the bas-to-emitter voltage of the transistor 118, and the voltage across the Zener diode 122, the transistor 118 will start to turn on. In turn, the transistors 130 and 132 will also start to turn on. As soon as the transistors 130 and 132 start to turn on, the capacitor 136 starts to charge through the emitter-to-base junction of the transistor 130, the resistor 138, and the transistor 132. The capacitor 136 and the resistor 138 thus acts as a regenerative circuit to achieve a very fast turn on of the transistors 130 and 132, and maintain these transistors 130 and 132 fully turned on until the voltage across the capacitor 114 is increased sufficiently to fully turn on the transistor 118, which then maintains the transistors 130 and 132 in their fully conductive state. When the transistor 132 is switched from its nonconducting to its conducting state, a pulse of direct current flows from the positive terminal P of the DC power supply 44 through the capacitor 156, the set coil 142, the diode 162, and the transistor 132 to the negative terminal N of the DC power supply, until the capacitor 156 is fully charged. The pulse of direct current is of sufficient amplitude and duration to cause the indicator 146 to move to its indicating position. Also, when the transistor 132 is switched to its conducting state, the operating coil 166 of the relay 164 is energized and closes the contacts 168, to either energize an alarm circuit, or to initiate a tripping operation of the circuit interrupter 10. If the relay contacts 168 are connected to energize an alarm circuit, and the circuit condition which caused the transistor 102 to be turned off is corrected or disappears, the transistor 102 will again turn on, and the capacitor 114 will be discharged through the diode 108, the resistor 106 and the transistor 102. The transistor 118 is switched off when the capacitor 114 is discharged. If the capacitor 136 has been fully charged before the transistor 118 is switched off, the transistor 130 and 132 will be switched off when the transistor 118 is switched off. When the transistor 132 is switched off, the capacitor 136 will quickly discharge through the diode 128, the operating coil 166 of the relay 164, and the diode 170. The magnetic energy stored by the operating coil 166 will nullify at least part of the charge stored by the capacitor 136 at the time the transistor 132 is switched off, to thus more quickly discharge the capacitor 136. The capacitor 136 can also discharge through the diode 128, the resistor 160 and the diode 162. When the transistor 132 is switched off, the capacitor 156 is discharged through the resistor 160 and the diode 158.

If the abnormal condition of the alternating electric power system causing pickup of the ground pickup circuit 104 disappears and the transistor 118 is turned off before the capacitor 136 has been fully charged, the transistors 130 and 132 will not be switched off until the capacitor 136 has been fully charged.

If the contacts 168 of the relay 164 are connected to energize the trip coil 48 of the circuit interrupter 10 when the operating coil 166 is energized, when the interrupting contacts 12 of the circuit interrupter 10 open, the transistor 102 will be turned on to discharge the capacitor 114, the transistors 118, 130, and 132 will be turned off, and the capacitors 136 and 156 will be discharged, in the same manner as explained above.

After the circuit interrupter 10 has been tripped or the abnormal condition of the alternating electric power system causing pickup of the pickup circuit 104 has been corrected or has disappeared to deenergize the relay 164, the indicator 146 can be manually reset to its non-indicating position by momentarily closing the pushbutton contacts 154 to allow a pulse of direct current to flow from the positive terminal P of the DC power supply 144 through the capacitor 148 and the reset coil 144, to move the indicator 146 to its non-indicating position. When the pushbutton contacts 154 are opened, the capacitor 148 will discharge through the resistor 152 and the diode 150.

When the relay contacts 168 are connected to energize the trip coil 48, the indicator 146 can be automatically reset to its non-indicating position when the circuit interrupter 10 is closed by disconnecting or removing the pushbutton contacts 154 and the resistor 152, and connecting the reset coil 144, the capacitor 148, and the diode 150 to the close switching element 52, the closing coil 54, the auxiliary contacts 56, the resistor 58, and the diode 62, in the same manner as shown in FIGS. 1 and 2, and as described in detail above.

The transistor 132 must be quickly switched from its nonconducting state to its fully conducting state to assure that charging current for the capacitor 156, flowing through the set coil 142, is of sufficient amplitude and duration to cause the indicator 146 to move to its indicating position. When the capacitor 136 is removed from the circuit shown in FIG. 3, and the adjustable resistor 112 is set to supply a low timing current to the timing capacitor 114, the transistors 118, 130 and 132 are switched from their nonconducting state to their fully conducting state at a relatively slow rate, to partially charge the capacitor 156 while the transistor 132 is being switched on. As a result, the amplitude of the DC pulse flowing through the set coil 142 is insufficient to cause the indicator 146 to move to its indicating position. However, when the capacitor 136 is connected in the output circuit 120, as shown in FIG. 3, the transistor 132 is quickly turned on to move the indicator 146 to its indicating position, even when the capacitor 114 is charged at a relatively slow rate by a very low timing current in the order of one microampere.

It is not intended that the invention be limited to the above-described specific embodiments which are intended only as examples. For example, in the reset coil circuit of FIG. 1, the capacitor 60 is shown connected between the resistor-diode combination of the resistor 58 and the diode 62 connected in parallel, and the coil-diode combination of the reset coil 26 and the diode 32. However, the resistor-diode combination, 58, 62, the capacitor 60, and the coil-diode combination 26, 32 can be series-connected in any order across the closing coil 54, so long as the capacitor 60 is charged by a direct current flowing through the diode 62 and through the reset coil 26 in the proper direction to move the indicator 28 to its indicating position, and the discharge path of the capacitor 60 includes the closing coil 54 (or an equivalent resistive element), the resistor 58, and the diode 32. Also, a single cam switch could be used in place of the close switching element 52 and the normally closed auxiliary contacts 56, for energizing the closing coil 54 to initiate a tripping operation and deenergizing the closing coil 54 when the interrupting contacts 12 are closed.

Since various modifications, adaptations, and variations of the forgoing specific disclosure can be made without departing from the teachings of the present invention, it is intended that the spirit and scope of this invention be limited only by the terms of the appended claims.

What is claimed is:

1. An automatically-reset, trip indicator for a circuit interrupter of an alternating electric system, wherein the circuit interrupter includes at least one pair of separable current interrupting contacts disposed in one phase circuit of the alternating electric system, interrupter closing means for closing the circuit interrupter by moving at least one interrupting contact of said at least one pair of interrupting contacts into a closed position at which the two interrupting contacts of said at least one pair of interrupting contacts are electrically engaged, an interrupter tripping means for tripping the circuit interrupter by moving said at least one interrupting contact of said at least one pair of interrupting contacts into an opened position at which the two interrupting contacts of said at least one pair of interrupting contacts are disengaged and spaced apart, and wherein the trip indicator comprises:

a direct voltage supply, having a positive output terminal and a negative output terminal;

an electromagnetic status indicator, including an indicator which is movable between an indicating position and a non-indicating position, a set coil which includes a positive terminal and a negative terminal and which is magnetically coupled to the indicator for moving the indicator to its indicating position when a first pulse of direct current flows through the set coil in a first direction from the set coil positive terminal to the set coil negative terminal, and a reset coil which includes a positive terminal and a negative terminal and which is magnetically coupled to the indicator for moving the indicator to its non-indicating position when a second pulse of direct current flows through the reset coil in a first direction from the reset coil positive terminal to the reset coil negative terminal;

a set coil energizing means, coupled to the alternating electric system and to the direct voltage supply, for causing the first pulse of direct current to flow through the set coil in the first direction when a tripping operation of the circuit interrupter is initiated at the same time that a particular abnormal condition exists in the alternating electric system;

a reset coil energizing means, which includes
a first resistive element,
a first switching means for connecting the first resistive element across the positive and negative output terminals of the direct voltage supply during a closing operation of the circuit interrupter, the first switching means closing when a closing operation of the circuit interrupter is initiated by the interrupter closing means and opening when the at least one interrupting contact is moved to the closed position,
a resistor-diode combination which includes a second resistive element and a first diode, having a positive terminal, or anode, and a negative terminal, or cathode, which is connected in parallel arrangement across the second resistive element,
a coil-diode combination which includes the reset coil and a second diode, having a positive terminal connected to the reset coil negative terminal and a negative terminal connected to the reset coil positive terminal, and
a first capacitor, which is connected in series arrangement with the resistor-diode combination and the coil-diode combination across the first resistive element such that, when the first switching means closes to connect the first resistive element across the positive and negative output terminals of the direct voltage supply, the second pulse of current will flow through the first capacitor, through the first diode of the resistor-diode combination in a forward direction from the positive terminal to the negative terminal of the first diode, and through the reset coil of the coil-diode combination in the first direction until the first capacitor is fully charged, and when the first switching means opens to disconnect the first switching means from the direct voltage supply, the first capacitor will discharge through the first resistive element, the second resistive element of the resistor diode combination, and the second diode of the coil-diode combination.

2. A trip indicator for a circuit interrupter, as described in claim 1, wherein the set coil energizing means comprises:
a first capacitor, connected in series arrangement with the reset coil and the second resistive element across the first resistive element;
a third diode, having a positive terminal connected to the set coil negative terminal and a negative terminal connected to the set coil positive terminal;
a second capacitor which is connected in series arrangement with the set coil;
a third resistive element which is connected across the series arrangement of the set coil and the second capacitor;
a second switching means, which is disposed in series arrangement with the third resistive element and which is actuated by the pickup signal produced by the sensing means to close upon receipt of the pickup signal; and
a third switching means for connecting the series arrangement of the second switching means and the third resistive element across the positive and negative terminals of the direct voltage supply so that one of the set coil terminals is connected to the direct voltage terminal of the same polarity when both the second and third switching means are closed, the third switching means closing when tripping of the circuit interrupter is initiated by the interrupter tripping means and opening when the at least one interrupting contact is moved to the opened position.

3. A trip indicator, as described in claim 1, wherein the first resistive element is a closing coil of the circuit interrupter, which is energized to initiate a tripping operation of the circuit interrupter.

4. A trip indicator, as described in claim 3, wherein the first switching means comprises a pair of normally-closed auxiliary contacts of the circuit interrupter, and a close switching element, the normally-closed pair of auxiliary contacts, the close switching element, and the closing coil being connected in series arrangement between the direct voltage supply positive and negative output terminals, whereby, when the circuit interrupter is closed and the close switching element is closed or rendered conductive, the closing coil is energized to initiate a tripping operation of the circuit interrupter.

5. A trip indicator, as described in claim 4, wherein the circuit interrupter further comprises system sensing means, coupled to the alternating electric system, for producing a positive output signal whenever a particular abnormal condition of the alternating electric system occurs, and the close switching element is a silicon controlled rectifier, having a positive terminal, or anode, a negative terminal, or cathode, and a gate, one of the positive and negative terminals of the silicon controlled rectifier being connected to the direct voltage supply terminal of the same polarity when the circuit interrupter is closed, the gate of the silicon controlled rectifier being connected to receive the positive output signal of the system sensing means,     whereby, the silicon controlled rectifier is rendered conductive upon receipt of the positive output signal of the system sensing means.

6. An automatically-reset, overcurrent trip indicator for a circuit interrupter of an alternating electric system, wherein the circuit interrupter includes at least one pair of separable current interrupting contacts disposed in one phase circuit of the alternating electric system, interrupter closing means for moving at least one interrupting contact of said at least one pair of interrupting contacts into a closed position at which the two interrupting contacts of said at least one pair of interrupting contacts are electrically engaged, an interrupter tripping means for moving said at least one interrupting contact of said at least one pair of interrupting contacts into an opened position at which the two interrupting contacts of said at least one pair of interrupting contacts are disengaged and spaced apart, and wherein the overcurrent trip indicator comprises:

a direct voltage supply, having a positive output terminal and a negative output terminal;

a first resistive element;

a first switching means for connecting the first resistive element across the positive and negative output terminals of the direct voltage supply during a closing operation of the circuit interrpputer, the first switching means closing when the closing operation of the circuit interrupter is initiated by the interrupter closing means and opening when the at least one interrupting contact is moved to the closed position;

a second resistive element having a first end connected to one end of the first resistive element and having a second opposite end;

a first diode, having a positive terminal, or anode, and a negative terminal, or cathode, which is connected across the second resistive element so that one of the diode terminals is connected to the direct voltage supply terminal of the same polarity when the second switching means is closed;

at least one indicator assembly which includes overcurrent sensing means, coupled to the alternating electric system to sense a current of the alternating electric system, for producing an overcurrent signal whenever the current of the alternating electric system exceeds a predetermined value,         an electromagnetic status indicator, including an indicator which is movable between an indicating position and a non-indicating position, a set coil which includes a positive terminal and a negative terminal and which is magnetically coupled to the indicator from moving the indicator to its indicating position when a pulse of direct current flows through the set coil in a first direction from the set coil positive terminal to the set coil negative terminal, and a reset coil which includes a positive terminal and a negative terminal and which is magnetically coupled to the indicator from moving the indicator to its non-indicating position when a positive direct current flows through the reset coil in a first direction from the reset coil positive terminal to the reset coil negative terminal,     a second diode, having a positive terminal connected to the reset coil negative terminal and a negative terminal connected to the reset coil positive terminal to allow current to flow through the second diode from the reset coil negative terminal to the reset coil positive terminal and to block current from flowing through the second diode from the reset coil positive terminal to the reset coil negative terminal,     a first capacitor, connected in series arrangement with the reset coil and the second resistive element across the first resistive element,     a third diode, having a positive terminal connected to the set coil negative terminal and a negative terminal connected to the set coil positive terminal, to allow current to flow from the set coil negative terminal through the third diode to the set coil positive terminal and to block current from flowing from the set coil positive terminal through the third diode to the set coil negative terminal,     a second capacitor which is connected in series arrangement with the set coil,     a third resistive element which is connected across the series arrangement of the set coil and the second capacitor, and     a second switching means, which is disposed in series arrangement with the third resistive element and which is actuated by the overcurrent signal to close upon receipt of the over current signal; and     a third switching means for connecting the series arrangement of the second switching means and the third resistive element across the positive and negative terminals of the direct voltage supply so that one of the set coil terminals is connected to the direct voltage supply terminal of the same polarity when both the second and third switching means are closed, the third switching means closing when tripping of the circuit interrupter is initiated by the interrupter tripping means and opening when the at least one interrupting contact is moved to the opened position;

whereby, when the alternating electric system current monitored by the overcurrent sensing means exceeds said predetermined value and the circuit interrupter is tripped, first, the overcurrent signal produced by the overcurrent sensing means will cause the second switching means to close, then, when the tripping operation is initiated, the third switching means will close to connect the series arrangement of the set coil and the second capacitor to the direct voltage supply and allow a pulse of direct current to flow in the first direction through the set coil until the second capacitor is fully charged, the magnitude and duration of the direct current pulse being sufficient to cause the indicator to move to its indicating position, and next, when the interrputing contacts are fully opened, the third switching means is opened and the second capacitor is discharged through the third diode and the third resistive element, which are connected in series arangement with the first capacitor to form a second capacitor discharge path, and thereafter, when a closing operation of the circuit interrupter is initiated, the first switching means will close to connect the series arrangement of the first diode, the reset coil and the first capacitor to the direct voltage supply and allow a pulse of direct current to flow in the first direction through the reset coil until the first capacitor is fully charged, the magnitude and duration of the direct current pulse being sufficient to cause the indicator to move to its non-indicating position, and next, when the interrupting contacts are fully closed, the first switching means is opened and the first capacitor is discharged through the first resistive element, the second resistive element, and the second diode which are connected in series arrangement with the first capacitor to form a first capacitor discharge path.

7. An overcurrent trip indicator for a circuit interrupter, as described in claim 1, wherein:
the alternating electric system is a three phase system;
the circuit interrupter includes three pairs of separable current interrupting contacts disposed in the three phases of the alternating electric system respectively; and
the overcurrent trip indicator includes three indicator assemblies, the three overcurrent sensing means of the three indicator assemblies being coupled to the alternating electric system to sense the three phase currents of the alternating electric system respectively.

8. An overcurrent trip indicator for a circuit interrupter, as discribed in claim 2, wherein;
the three phase alternating system is a grounded, wye-connected system and the overcurrent trip indicator further comprises a fourth indicator assembly, the overcurrent sensing means of the fourth indicator assembly being coupled to the alternating electric system to sense the ground current of the alternating electric system.

9. A status indicator circuit for indicating the occurrence of an abnormal condition in an alternating electric system, which comprises:
a direct voltage supply, having a positive output terminal and a negative output terminal;
a first transistor, having a base terminal, an emitter terminal and a collector terminal, one of the emitters and collector terminals being connected to the direct voltage supply terminal of the same polarity;
monitoring means, coupled to the alternating electric system and to the direct voltage supply, for supplying a turn-on signal to the base terminal of the first transistor upon the occurrence of the abnormal condition of the alternating electric system, to render the first transistor conductive between its emitter and collector terminals;

a PNP transistor and a NPN transistor, each having a base terminal, an emitter terminal, and a collector terminal and each having one of its emitter and collector terminals connected to the direct voltage supply terminal of the same polarity, a first one of the PNP and NPN transistors having its base terminal connected to the other of the first transistor emitter and collector terminals and the first one of the PNP and NPN transistors having the other of its emitter and collector terminals connected to the base of a second one of the PNP and NPN transistor;

an electromagnetic status indicator, including an indicator which is movable between an indicating position and a non-indicating position, a set coil which includes a positive terminal and a negative terminal and which is magnetically coupled to the indicator for moving the indicator to its indicating position when a first pulse of direct current flows through the set coil in a first direction from the set coil positive terminal to the set coil negative terminal, and a reset coil which includes a positive terminal and a negative terminal and which is magnetically coupled to the indicator from moving the indicator to its non-indicating position when a second pulse of direct current flows through the reset coil in a first direction from the reset coil positive terminal to the reset coil negative terminal;

a first diode, having a positive terminal, or anode, connected to the set coil negative terminal and a negative terminal, or cathode, connected to the set coil positive terminal;

a first capacitor which is connected in series arrangement with the set coil;

a resistive element which is connected across the series arrangement of the set coil and the second capacitor, and which has one end connected to the other of the emitter and collector terminals of the second one of the PNP and NPN transistors and which has an opposite end connected to the direct voltage supply terminal of opposite polarity to the polarity of the emitter and collector terminals of the second one of the PNP and NPN transistors;

a second capacitor connected between the base terminal of the first one of the PNP and NPN transistors and the other of the emitter and collector terminals of the second one of the PNP and NPN transistors; and a second diode, connected between the base of the first one of the PNP and NPN transistors and the one of the emitter and collector terminals of the first one of the PNP and NPN transistors which is connected to the direct voltage supply terminal of the same polarity.

* * * * *